Sept. 21, 1965  G. B. STILLWAGON, JR  3,207,196
COUNTERSINKING TOOL
Filed June 24, 1963
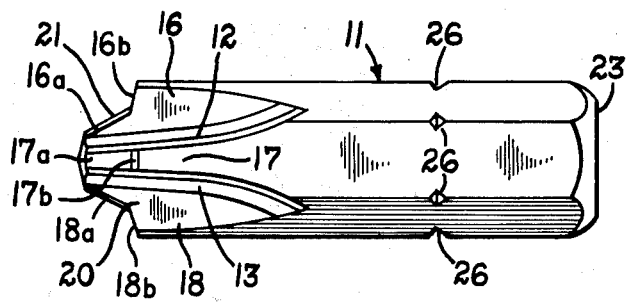
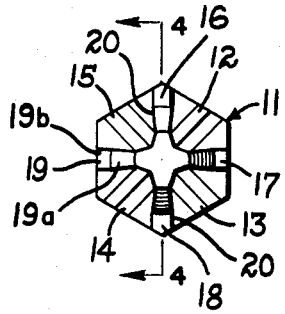
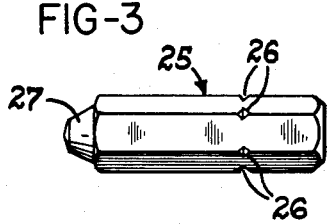
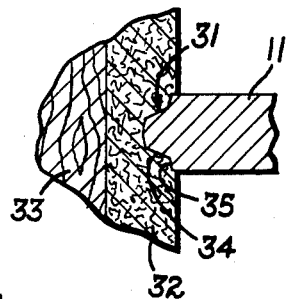
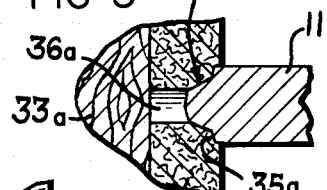
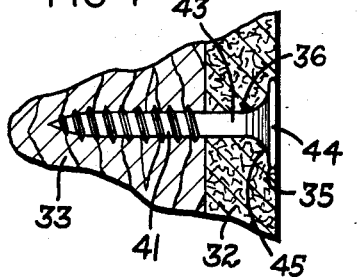
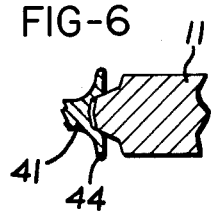
INVENTOR.
GEORGE B. STILLWAGON, JR.
BY
ATTORNEYS

United States Patent Office 3,207,196
Patented Sept. 21, 1965

3,207,196
COUNTERSINKING TOOL
George B. Stillwagon, Jr., Dayton, Ohio, assignor to Gardner-Denver Company, Dayton, Ohio, a corporation of Delaware
Filed June 24, 1963, Ser. No. 289,997
2 Claims. (Cl. 145—123)

This invention relates to tools and more particularly to a combined screw driving and countersinking tool for forming suitable depressions or bores in dense materials and for driving screws into such materials.

More specifically, tools constructed according to the invention are especially useful in forming countersink depressions or bores and are also useful in driving the screws into the material at the point of such depressions or bores, after the depressions or bores have been formed, without the necessity of changing the tool in the driver.

Heretofore in performing the operations for which the illustrated embodiments of the invention are designed, it has usually been necessary to use a plurality of different tools. For example, one tool was required for the forming of countersink and counterbore portions of a bore or depression such as is referred to above and another tool was required for driving the screw.

In the securing of dense materials such as hard wallboard by means of one or more screws where a tight adherence is desired, difficulties have been encountered due to the densities of the materials. Some of these difficulties may be overcome such as by forming a bore in the dense material. Often, self cutting or tapping screws are used, in which case no bore is needed. Due to the greater diameter of the head of the screw and the usual difference in density between the wallboard and the material behind the board, it is substantially impossible (by the usual method of driving the screw alone) to impress the head of the screw into the dense material without destroying the hold of the screw threads. Also due to the taper of the head of the screw, it is desirable that a corresponding taper or countersink portion be formed adjacent the outer portion of the bore. Also in order that the head of the screw not protrude above the surface of the dense material, it is usually necessary that the very outer portion of the bore be enlarged by a counterbore.

Examples of the dense building materials into which it is desirable to form a depression with countersink and counterbore portions are hardboard or pressed board such as are manufactured and sold under the trade-names of Transite, Masonite, Formica, Novaply, etc. Examples of the softer building materials to which such hardboard may be secured are wood or metal framing material.

One of the objects of the invention therefore is the provision of a tool capable of performing a plurality of operations in the securing of building materials together.

A further object of the invention is the provision of a combined boring and driving tool capable of forming suitable depressions or bores in hardboard in which each such depression has a countersink portion and a counterbore portion.

A further object of the invention is the provision of a combined boring and driving tool for reducing costs of hard wallboard construction by reducing the number of tools required and the time required in securing such wallboard in place.

Further objects, features and advantages of the invention disclosed will be apparent from this specification, the claims following and the attached drawings illustrating an embodiment of the invention.

In the drawing:

FIG. 1 is a view in elevation of a tool forming an embodiment of, and formed according to the invention;

FIG. 2 is a view in end elevation of the tool shown in FIG. 1;

FIG. 3 is a view in side elevation of a blank from which the tool of FIG. 1 is formed;

FIG. 4 is a fragmentary view in vertical section through the driver wings such as along the line 4—4 of FIG. 2, illustrating the use of the tool shown, for the formation of a bore or depression in a dense material which it is desired to secure to an adjacent softer material;

FIG. 5 is a sectional view similar to FIG. 4 illustrating the use of the tool shown, in the formation of a countersink portion and a counterbore in a dense material, which has previously been formed with a uniform bore;

FIG. 6 is another fragmentary view in vertical section similar to FIG. 4 illustrating the use of the tool shown for the driving of a screw; and FIG. 7 is a fragmentary view in vertical section illustrating a dense material secured to a softer material by means of a screw.

Referring to the drawing, there is shown in FIGS. 1 and 2, a tool 11 constructed according to the invention. This tool may be formed from any (preferably symmetrical) stock or blank but as shown is formed from a hexagonal blank. It is machined to form a plurality of flutes or valleys as at 12, 13, 14 and 15 thus forming from the material of the original blank between the valleys a plurality of symmetrically combined driving and cutting wings such as at 16, 17, 18 and 19 equally spaced from each other. As shown in the embodiment illustrated, the wings are each spaced 90° from the next adjacent wings so that there are four wings each being positioned opposite one other wing. The drive surfaces 20 of each of the wings 16–19 join the inclined outer surfaces 21 along straight lines forming a relatively sharp break or angle of approximately 90°, for providing an abrading or cutting edge which is effective to remove wallboard material when the tool is brought into contact with the wall and rotated, such as by a power driver.

In the embodiment illustrated, two of the wings 16 and 18 constitute portions of the original blank which formed two of the apices of the hexagonal stock. The other two wings 17 and 19 are formed from material positioned at substantially the midpoint of the flat surfaces of the hexagonal stock. It is obvious that wings 16 and 18 will have slightly greater radii than wings 17 and 19. However, this is somewhat fortuitous as no attempt is made to insure that the wings are formed at the apices and at the center of the flats. By suitable positioning of the stock while being machined the radii of all of the wings can be made equal.

Each of the wings has a countersinking portion and a counterboring portion. The wing 16 has the countersinking portion 16a and the counterboring portion 16b. Likewise wings 17, 18 and 19 have respectively countersinking portions 17a, 18a and 19a and counterboring portions 17b, 18b and 19b respectively. As may be readily seen the countersinking portions 16a, 17a, 18a and 19a form a uniform slope with respect to the axis or centerline of the tool. The counterboring portions 16b, 17b, 18b and 19b extend from the countersinking portions to the full width of the tool and are also shown as sloping, although at a greater angle to the axis. Although the counterboring portions preferably should be sloping for example at an angle of 15% to the perpendicular as shown, it is possible that such slope might be eliminated by making them perpendicular to the axis or centerline of the tool.

In FIG. 3 there is illustrated a blank 25 which is suitable for the formation of the tool 11. The maximum diameter as measured between apices of the stock is slightly less than the diameter of the head to be recessed but is substantially larger than the driving recess in the head of the screw. The blank 25 may be provided with notches 26 by means of which the tool may be held and retained in a suitable handle for driving. The forward end of the blank is turned to form a frusto-conical shape shown as 27 which will define the outer surfaces 21 of the driving and cutting wings.

The slope or inclination of the countersinking portions is preferably uniform and constant, as defined by the surface of the cone 27 of the blank 25. The wings are proportioned to be received within the cruciform opening of a screw head for driving the screw. However, only part of the linear length of wings 16–19 is employed for driving the screw, as shown in FIG. 6. The remainder of the length of the wings is proportioned to form the desired depth and slope of the countersink opening in the wallboard.

Referring to FIG. 4 for an explanation of the operation or the use of the tool 11 in the formation of a depression 31 in the hardboard 32, it will be readily seen that rotation of the tool 11 has formed depression 31. The depression 31 consists of the countersink portion 34 and the counterbore portion 35 in the hardboard 32. The countersink portion 34 is obviously sloping while the counterbore portion 35 is also slightly sloping but is substantially flat. The tool 11 does not act so much as a cutting tool as it does as a wearing, rubbing or abrading tool, so that the depression 31 is formed mainly by a rubbing or abrading action of the wings with the wallboard. It is not desired that the tool 11 cut too well, but rather that it rub out the depression 31.

The break or discontinuity in contour or slope between the countersinking and counterboring portions provides a sudden increase in resistance when the tool is used to form a prepared counterbore for the screw. This sudden increase in resistance prevents an operator from inadvertently drilling through the wallboard and provides a means by which the operator can continue the drilling for a few additional moments to provide the desired depth of the counterbore 35.

In FIG. 5, there is illustrated the use of the tool in abrading a countersink portion 34a and a counterbore portion 35a in a hardboard 32a which is to be fastened to a wooden stud 33a. The hardboard 32a is initially formed with the uniform bore 36a and the edges of this bore 36a are abraded by the tool 11 to form the depression 31a at the entrance to the bore 36a.

In FIG. 7 the screw 41 is shown following securing the hardboard 32 to the stud 33 by the tool 11. The screw 41 may be a self-driving or self-tapping screw and the threads 42 thereof cut and abrade a bore 36 in the hardboard 32 which bore is slightly larger than the shank 43 of the screw 41. The head 44 of the screw 41 is larger than the original counterbore 35 as formed by the tool 11 but the original counterbore 35 is made intentionally smaller than the head 44, so that as the threads 42 draw the head 44 into the counterbore 35 it will be forced into such counterbore and distort the fibers of the hardboard to insure a tight uniform fit and fasten the hardboard 32 securely to the stud 33. Similarly the filet 45 of the screw 41 has enlarged slightly the original countersink portion 34.

It will therefore be seen that this invention provides a versatile tool for forming a depression or recess for screw heads in hard wallboard and for driving the screws into the recess formed thereby. Thus, the use of this tool eliminates the requirement for separate countersinking and driving tools, with a resulting saving of investment and time in changing from one tool to the other. The combination driving and recessing wings of the tool, together with the sharp break or increase in slope between the countersinking and counterboring portions, assure that the recesses are consistently formed at the correct depth and diameter for the given screws being used providing uniform appearance to the finished wall within minimum of repair due to recesses being formed to an incorrect depth. Meticulous attention and care by the operator to the forming of each recess is substantially reduced by reason of the change in resistance which is easily recognized when the counterboring tool portion comes into contact with the hard wallboard material, making for increased production.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A boring tool for forming countersink recesses in wallboard material and the like which recesses are adapted to receive screw heads therein, comprising an elongated metal body, means on the forward end of said body defining four equally spaced wings separated by flutes and extending outwardly and rearwardly to form a countersink portion, each of said wings being further formed with an outwardly extending counterbore portion formed as an integral extension of said wings and leading to the outer surface of said body with said outwardly extending portion having a substantially increased slope as compared to said countersink portion providing substantially increased resistance to movement into such material, and the junction between said flutes and said wings at said countersink and counterbore portions forming abrading edges for removing wallboard material when pressed directly into engagement with a wallboard and rotated.

2. A boring tool for forming countersink recess in wallboard material, comprising an elongated metal body, means on the forward end of said body defining a plurality of equally spaced wings separated by flutes and extending outwardly and rearwardly with a generally uniform slope to form a countersink portion, each of said wings being further formed with an outwardly extending counterbore portion formed as an integral extension of said wings and leading to the outer surface of said body with said outwardly extending portion having a substantially increased slope as compared to said countersink portion, the junction between said flutes and said wings forming a break of approximately 90° forming abrading edges for removing wallboard material when pressed directly into engagement with a wallboard and rotated, and the outer maximum mean diameter of said wings at said counterbore portions being less than the diameter of a screw head for forming in such wallboard a countersinking recess for such head.

References Cited by the Examiner

UNITED STATES PATENTS 74,490   2/68   Bidwell.

WILLIAM FELDMAN, *Primary Examiner.*